(12) United States Patent
Sauerwein, Jr.

(10) Patent No.: US 8,561,903 B2
(45) Date of Patent: Oct. 22, 2013

(54) SYSTEM OPERATIVE TO ADAPTIVELY SELECT AN IMAGE SENSOR FOR DECODABLE INDICIA READING

(75) Inventor: James Timothy Sauerwein, Jr., Charlotte, NC (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 183 days.

(21) Appl. No.: 13/018,058

(22) Filed: Jan. 31, 2011

(65) Prior Publication Data

US 2012/0193421 A1    Aug. 2, 2012

(51) Int. Cl.
*G06K 7/10* (2006.01)

(52) U.S. Cl.
USPC .................. 235/455; 235/462.44; 235/472.01

(58) Field of Classification Search
USPC ............. 235/462.44, 462.45, 462.46, 472.01, 235/472.02, 472.03, 455
See application file for complete search history.

(56) References Cited

U.S. PATENT DOCUMENTS

| | | | |
|---|---|---|---|
| 3,978,317 A | 8/1976 | Yamaguchi et al. | |
| 4,057,784 A | 11/1977 | Tafoya | |
| 4,085,423 A | 4/1978 | Tsunoda et al. | |
| 4,330,583 A | 5/1982 | Datta et al. | |
| 4,333,187 A | 6/1982 | Schuler | |
| 4,542,528 A | 9/1985 | Sanner et al. | |
| 4,721,849 A | 1/1988 | Davis et al. | |
| 4,758,717 A | 7/1988 | Shepard et al. | |
| 4,760,248 A | 7/1988 | Swartz et al. | |
| 4,774,715 A | 9/1988 | Messenger | |
| 4,818,847 A | 4/1989 | Hara et al. | |
| 4,841,132 A | 6/1989 | Kajitani et al. | |
| 4,847,490 A | 7/1989 | Nishikama | |
| 4,866,257 A | 9/1989 | Elliott et al. | |
| 4,877,949 A | 10/1989 | Danielson et al. | |
| 4,900,907 A | 2/1990 | Matusima et al. | |
| 4,918,297 A | 4/1990 | Kurimoto | |
| 4,920,255 A | 4/1990 | Gabeler | |
| 4,945,216 A | 7/1990 | Tanabe et al. | |
| 4,964,167 A | 10/1990 | Kunizawa et al. | |
| 5,010,241 A | 4/1991 | Butterworth | |
| 5,019,699 A | 5/1991 | Koenck | |
| 5,034,619 A | 7/1991 | Hammond, Jr. | |
| 5,046,066 A | 9/1991 | Messenger | |
| 5,059,778 A | 10/1991 | Zouzoulas et al. | |
| 5,059,779 A | 10/1991 | Krichever et al. | |
| 5,101,406 A | 3/1992 | Messenger | |
| 5,132,525 A | 7/1992 | Swartz et al. | |

(Continued)

*Primary Examiner* — Karl D Frech
(74) *Attorney, Agent, or Firm* — Heslin Rothenber Farley & Mesiti P.C.

(57) ABSTRACT

A decodable indicia reading system can be provided for use in locating and decoding a bar code symbol represented within a frame of image data. The system can comprise a central processing unit (CPU), a memory communicatively coupled to the CPU, and two or more image sensors communicatively coupled to the CPU or to the memory. The system can be configured to select an image sensor for indicia reading by cycling through available image sensors to detect an image sensor suitable for an attempted indicia reading operation by comparing a measured parameter value to a pre-defined sensor-specific threshold value. The system can be further configured to select the first suitable or the best suitable image sensor for the attempted decodable indicia reading operation based upon the comparison result. The system can be further configured to notify the system operator which image sensor has been selected. The system can be further configured to obtain a decodable indicia image by the selected image sensor.

27 Claims, 3 Drawing Sheets

(56) References Cited

U.S. PATENT DOCUMENTS

| | | |
|---|---|---|
| 5,149,948 A | 9/1992 | Chisholm |
| 5,157,248 A | 10/1992 | Barkan |
| 5,177,346 A | 1/1993 | Chisholm |
| 5,206,881 A | 4/1993 | Messenger et al. |
| 5,208,449 A | 5/1993 | Eastman et al. |
| 5,233,171 A | 8/1993 | Baldwin |
| 5,235,167 A | 8/1993 | Dvorkis et al. |
| 5,254,977 A | 10/1993 | MacDonald |
| 5,280,161 A | 1/1994 | Niwa |
| 5,280,164 A | 1/1994 | Barkan |
| 5,286,960 A | 2/1994 | Longacre, Jr. et al. |
| 5,291,008 A | 3/1994 | Havens et al. |
| 5,294,783 A | 3/1994 | Hammond, Jr. et al. |
| 5,296,689 A | 3/1994 | Reddersen et al. |
| 5,308,962 A | 5/1994 | Havens et al. |
| 5,317,136 A | 5/1994 | Hasegawa et al. |
| 5,319,182 A | 6/1994 | Havens et al. |
| 5,331,176 A | 7/1994 | Sant'Anselmo et al. |
| 5,340,971 A | 8/1994 | Rockstein et al. |
| 5,340,972 A | 8/1994 | Sandor |
| 5,347,113 A | 9/1994 | Reddersen et al. |
| 5,347,114 A | 9/1994 | Tanaka |
| 5,378,883 A | 1/1995 | Batterman et al. |
| 5,389,917 A | 2/1995 | LaManna et al. |
| 5,397,054 A | 3/1995 | Ziegs |
| 5,404,002 A | 4/1995 | Tang |
| 5,406,062 A | 4/1995 | Hasegawa et al. |
| 5,406,063 A | 4/1995 | Jelen |
| 5,410,141 A | 4/1995 | Koenck et al. |
| 5,420,411 A | 5/1995 | Salatto, Jr. et al. |
| 5,430,286 A | 7/1995 | Hammond, Jr. et al. |
| 5,440,111 A | 8/1995 | Eastman et al. |
| 5,449,892 A | 9/1995 | Yamada |
| 5,473,149 A | 12/1995 | Miwa et al. |
| 5,504,316 A | 4/1996 | Bridgelall et al. |
| 5,504,317 A | 4/1996 | Takahashi |
| 5,504,367 A | 4/1996 | Arackellian et al. |
| 5,510,606 A | 4/1996 | Worthington et al. |
| 5,532,692 A | 7/1996 | Tatsuya |
| 5,534,684 A | 7/1996 | Danielson |
| 5,541,419 A | 7/1996 | Arackellian |
| 5,550,364 A | 8/1996 | Rudeen |
| 5,550,367 A | 8/1996 | Plesko |
| 5,557,095 A | 9/1996 | Clark et al. |
| 5,572,006 A | 11/1996 | Wang et al. |
| 5,576,529 A | 11/1996 | Koenck et al. |
| 5,579,487 A | 11/1996 | Meyerson et al. |
| 5,585,616 A | 12/1996 | Roxby et al. |
| 5,591,955 A | 1/1997 | Laser |
| 5,597,997 A | 1/1997 | Obata et al. |
| 5,598,007 A | 1/1997 | Bunce et al. |
| 5,602,376 A | 2/1997 | Coleman et al. |
| 5,610,595 A | 3/1997 | Garrabrant et al. |
| 5,612,530 A | 3/1997 | Sanders et al. |
| 5,623,137 A | 4/1997 | Powers et al. |
| 5,635,700 A | 6/1997 | Fazekas |
| 5,637,854 A | 6/1997 | Thomas |
| 5,638,115 A | 6/1997 | Imai |
| 5,640,001 A | 6/1997 | Danielson et al. |
| 5,640,684 A | 6/1997 | Konosu et al. |
| 5,644,601 A | 7/1997 | Kawaguchi |
| 5,646,389 A | 7/1997 | Bravman et al. |
| 5,646,390 A | 7/1997 | Wang et al. |
| 5,648,650 A | 7/1997 | Sugifune et al. |
| 5,659,778 A | 8/1997 | Gingold et al. |
| 5,668,803 A | 9/1997 | Tymes et al. |
| 5,672,858 A | 9/1997 | Li et al. |
| 5,684,104 A | 11/1997 | Funk et al. |
| 5,684,290 A | 11/1997 | Arackellian et al. |
| 5,696,607 A | 12/1997 | Yamana et al. |
| 5,697,699 A | 12/1997 | Seo et al. |
| 5,701,001 A | 12/1997 | Sugifune et al. |
| 5,703,349 A | 12/1997 | Meyerson et al. |
| 5,714,745 A | 2/1998 | Ju et al. |
| 5,714,746 A | 2/1998 | Dvorkis et al. |
| 5,717,195 A | 2/1998 | Feng et al. |
| 5,717,221 A | 2/1998 | Li et al. |
| 5,723,868 A | 3/1998 | Hammond, Jr. et al. |
| 5,734,153 A | 3/1998 | Swartz et al. |
| 5,736,726 A | 4/1998 | VanHorn et al. |
| 5,739,518 A | 4/1998 | Wang |
| 5,743,633 A | 4/1998 | Chau et al. |
| 5,744,788 A | 4/1998 | Metlitsky et al. |
| 5,744,815 A | 4/1998 | Gurevich et al. |
| 5,745,176 A | 4/1998 | Lebens |
| 5,754,587 A | 5/1998 | Kawaguchi |
| 5,756,981 A | 5/1998 | Roustaei et al. |
| 5,763,864 A | 6/1998 | O'Hagan et al. |
| 5,777,743 A | 7/1998 | Bacchi et al. |
| 5,780,034 A | 7/1998 | Cohen et al. |
| 5,780,831 A | 7/1998 | Seo et al. |
| 5,780,834 A | 7/1998 | Havens et al. |
| 5,783,811 A | 7/1998 | Feng et al. |
| 5,784,102 A | 7/1998 | Hussey et al. |
| 5,786,586 A | 7/1998 | Pidhirny et al. |
| 5,793,903 A | 8/1998 | Lopresti et al. |
| 5,794,145 A | 8/1998 | Milam |
| 5,801,371 A | 9/1998 | Kahn et al. |
| 5,802,179 A | 9/1998 | Yamamoto |
| 5,804,802 A | 9/1998 | Card et al. |
| 5,804,809 A | 9/1998 | Eastman et al. |
| 5,811,784 A | 9/1998 | Tausch et al. |
| 5,814,827 A | 9/1998 | Katz |
| 5,815,200 A | 9/1998 | Ju et al. |
| 5,815,811 A | 9/1998 | Pinard et al. |
| 5,818,528 A | 10/1998 | Roth et al. |
| 5,821,518 A | 10/1998 | Sussmeier et al. |
| 5,825,006 A | 10/1998 | Longacre, Jr. et al. |
| 5,831,254 A | 11/1998 | Karpen et al. |
| 5,834,749 A | 11/1998 | Durbin |
| 5,834,754 A | 11/1998 | Feng et al. |
| 5,837,986 A | 11/1998 | Barile et al. |
| 5,838,720 A | 11/1998 | Morelli |
| 5,841,121 A | 11/1998 | Koenck |
| 5,848,064 A | 12/1998 | Cowan |
| 5,850,078 A | 12/1998 | Giordano et al. |
| 5,859,417 A | 1/1999 | Dvorkis et al. |
| 5,859,970 A | 1/1999 | Pleso |
| 5,872,354 A | 2/1999 | Hanson |
| 5,877,487 A | 3/1999 | Tani et al. |
| 5,886,338 A | 3/1999 | Arackellian et al. |
| 5,894,348 A | 4/1999 | Bacchi et al. |
| 5,905,251 A | 5/1999 | Knowles |
| 5,912,921 A | 6/1999 | Warren et al. |
| 5,914,478 A | 6/1999 | Bridgelall |
| 5,920,061 A | 7/1999 | Feng |
| 5,924,040 A | 7/1999 | Trompower |
| 5,929,418 A | 7/1999 | Ehrhart et al. |
| 5,932,139 A | 8/1999 | Oshima et al. |
| 5,932,862 A | 8/1999 | Hussey et al. |
| 5,942,741 A | 8/1999 | Longacre, Jr. et al. |
| 5,942,762 A | 8/1999 | Hecht |
| 5,945,660 A | 8/1999 | Nakasuji et al. |
| 5,946,344 A | 8/1999 | Warren et al. |
| 5,949,052 A | 9/1999 | Longacre, Jr. et al. |
| 5,949,054 A | 9/1999 | Karpen et al. |
| 5,949,056 A | 9/1999 | White |
| 5,949,057 A | 9/1999 | Feng |
| 5,955,720 A | 9/1999 | He et al. |
| 5,962,836 A | 10/1999 | Tani et al. |
| 5,965,863 A | 10/1999 | Parker et al. |
| 5,973,681 A | 10/1999 | Tanigawa et al. |
| 5,975,419 A | 11/1999 | Dickson et al. |
| 5,984,188 A | 11/1999 | Dvorkis et al. |
| 5,988,506 A | 11/1999 | Schaham et al. |
| 5,992,744 A | 11/1999 | Smith et al. |
| 5,992,746 A | 11/1999 | Suzuki |
| 6,010,070 A | 1/2000 | Mizuochi et al. |
| 6,015,088 A | 1/2000 | Parker et al. |
| 6,019,286 A | 2/2000 | Li et al. |
| 6,027,024 A | 2/2000 | Knowles |
| 6,029,893 A | 2/2000 | Tan et al. |
| 6,034,379 A | 3/2000 | Bunte et al. |
| 6,036,096 A | 3/2000 | Evers et al. |

(56) References Cited

U.S. PATENT DOCUMENTS

| | | | |
|---|---|---|---|
| 6,039,255 | A | 3/2000 | Seo |
| 6,045,047 | A | 4/2000 | Pidhirny et al. |
| 6,045,048 | A | 4/2000 | Wilz, Sr. et al. |
| 6,052,236 | A | 4/2000 | Nakasuji et al. |
| 6,053,408 | A | 4/2000 | Stoner |
| 6,060,722 | A | 5/2000 | Havens et al. |
| 6,062,475 | A | 5/2000 | Feng |
| 6,066,857 | A | 5/2000 | Fantone et al. |
| 6,068,188 | A | 5/2000 | Knowles |
| 6,072,401 | A | 6/2000 | Kumar |
| 6,092,728 | A | 7/2000 | Li et al. |
| 6,098,887 | A | 8/2000 | Figarella et al. |
| 6,119,939 | A | 9/2000 | Schwartz et al. |
| 6,119,944 | A | 9/2000 | Mulla et al. |
| 6,123,261 | A | 9/2000 | Roustaei |
| 6,123,264 | A | 9/2000 | Li et al. |
| 6,129,283 | A | 10/2000 | Imade et al. |
| 6,141,046 | A | 10/2000 | Roth et al. |
| 6,147,358 | A | 11/2000 | Hecht |
| 6,152,371 | A | 11/2000 | Schwartz et al. |
| 6,155,491 | A | 12/2000 | Dueker et al. |
| 6,164,544 | A | 12/2000 | Schwartz et al. |
| 6,164,546 | A | 12/2000 | Kumagai et al. |
| 6,178,426 | B1 | 1/2001 | Klein et al. |
| 6,179,208 | B1 | 1/2001 | Feng |
| 6,182,897 | B1 | 2/2001 | Knowles et al. |
| 6,186,404 | B1 | 2/2001 | Ehrhart et al. |
| 6,199,044 | B1 | 3/2001 | Ackley et al. |
| 6,213,397 | B1 | 4/2001 | Rando |
| 6,223,988 | B1 | 5/2001 | Batterman et al. |
| 6,230,975 | B1 | 5/2001 | Colley et al. |
| 6,254,003 | B1 | 7/2001 | Pettinelli et al. |
| 6,283,374 | B1 | 9/2001 | Fantone et al. |
| 6,298,176 | B2 | 10/2001 | Longacre, Jr. et al. |
| 6,303,929 | B1 | 10/2001 | Oshima et al. |
| 6,318,635 | B1 | 11/2001 | Stoner |
| 6,318,637 | B1 | 11/2001 | Stoner |
| 6,321,989 | B1 | 11/2001 | Wilz, Sr. et al. |
| 6,321,991 | B1 | 11/2001 | Knowles |
| 6,321,992 | B1 | 11/2001 | Knowles et al. |
| 6,323,503 | B1 | 11/2001 | Hecht |
| 6,330,973 | B1 | 12/2001 | Bridgelall et al. |
| 6,340,114 | B1 | 1/2002 | Correa et al. |
| 6,345,764 | B1 | 2/2002 | Knowles |
| 6,347,163 | B2 | 2/2002 | Roustaei |
| 6,347,743 | B2 | 2/2002 | Wilz, Sr. et al. |
| 6,352,204 | B2 | 3/2002 | Hattersley et al. |
| 6,352,517 | B1 | 3/2002 | Flock et al. |
| 6,360,949 | B1 | 3/2002 | Shepard et al. |
| 6,371,374 | B1 | 4/2002 | Schwartz et al. |
| 6,375,074 | B1 | 4/2002 | Dickson et al. |
| 6,389,010 | B1 | 5/2002 | Kubler et al. |
| 6,398,112 | B1 | 6/2002 | Li et al. |
| 6,412,699 | B1 | 7/2002 | Russell et al. |
| 6,412,700 | B1 | 7/2002 | Blake et al. |
| 6,431,452 | B2 | 8/2002 | Feng |
| 6,439,462 | B1 | 8/2002 | Dickson et al. |
| 6,507,864 | B1 | 1/2003 | Klein et al. |
| 6,535,493 | B1 | 3/2003 | Lee et al. |
| 6,539,360 | B1 | 3/2003 | Kadaba |
| 6,539,422 | B1 | 3/2003 | Hunt et al. |
| 6,540,140 | B1 | 4/2003 | Knowles et al. |
| 6,547,139 | B1 | 4/2003 | Havens et al. |
| 6,561,428 | B2 | 5/2003 | Meier et al. |
| 6,578,767 | B1 | 6/2003 | Barkan et al. |
| 6,585,159 | B1 | 7/2003 | Meier et al. |
| 6,595,422 | B1 | 7/2003 | Doljack |
| 6,601,768 | B2 | 8/2003 | McCall et al. |
| 6,607,128 | B1 | 8/2003 | Schwartz et al. |
| 6,629,641 | B2 | 10/2003 | Tsikos et al. |
| 6,637,658 | B2 | 10/2003 | Barber et al. |
| 6,655,595 | B1 | 12/2003 | Longacre, Jr. et al. |
| 6,661,521 | B1 | 12/2003 | Stern |
| 6,669,093 | B1 | 12/2003 | Meyerson et al. |
| 6,681,994 | B1 | 1/2004 | Koenck |
| 6,688,523 | B1 | 2/2004 | Koenck |
| 6,695,209 | B1 | 2/2004 | La |
| 6,722,569 | B2 | 4/2004 | Ehrhart et al. |
| 6,732,929 | B2 | 5/2004 | Good et al. |
| 6,749,120 | B2 | 6/2004 | Hung et al. |
| 6,786,414 | B2 | 9/2004 | Tsikos et al. |
| 6,808,114 | B1 | 10/2004 | Palestini et al. |
| 6,817,525 | B2 | 11/2004 | Piva et al. |
| 6,830,184 | B2 | 12/2004 | Tsikos et al. |
| 6,832,725 | B2 | 12/2004 | Gardiner et al. |
| 6,834,807 | B2 | 12/2004 | Ehrhart et al. |
| 6,837,437 | B2 | 1/2005 | Tsikos et al. |
| 6,843,417 | B1 | 1/2005 | Philyaw et al. |
| 6,877,661 | B2 | 4/2005 | Webb et al. |
| 7,061,395 | B1 | 6/2006 | Bromer |
| 7,077,321 | B2 | 7/2006 | Longacre, Jr. et al. |
| 7,083,097 | B2 | 8/2006 | Toyama et al. |
| 7,083,098 | B2 | 8/2006 | Joseph et al. |
| 7,185,817 | B2 | 3/2007 | Zhu et al. |
| 7,234,641 | B2 | 6/2007 | Olmstead |
| 7,240,844 | B2 | 7/2007 | Zhu et al. |
| 7,255,279 | B2 | 8/2007 | Zhu et al. |
| 7,270,274 | B2 | 9/2007 | Hennick et al. |
| 7,303,126 | B2 | 12/2007 | Patel et al. |
| 7,308,375 | B2 | 12/2007 | Jensen et al. |
| 7,320,431 | B2 | 1/2008 | Zhu et al. |
| 7,336,197 | B2 | 2/2008 | Ding et al. |
| 7,357,326 | B2 | 4/2008 | Hattersley et al. |
| 7,387,250 | B2 | 6/2008 | Muni |
| 7,398,927 | B2 | 7/2008 | Olmstead et al. |
| 7,490,778 | B2 | 2/2009 | Zhu et al. |
| 7,503,499 | B2 | 3/2009 | Zhu et al. |
| 7,513,430 | B2 | 4/2009 | Zhu et al. |
| 7,516,899 | B2 | 4/2009 | Laser |
| 7,527,207 | B2 | 5/2009 | Acosta et al. |
| 7,533,824 | B2 | 5/2009 | Hennick et al. |
| 7,568,628 | B2 | 8/2009 | Wang et al. |
| 7,611,060 | B2 | 11/2009 | Wang et al. |
| 7,656,556 | B2 | 2/2010 | Wang |
| 7,693,744 | B2 | 4/2010 | Forbes |
| 7,735,737 | B2 | 6/2010 | Kotlarsky et al. |
| 7,762,464 | B2 | 7/2010 | Goren et al. |
| 7,770,799 | B2 | 8/2010 | Wang |
| 7,775,436 | B2 | 8/2010 | Knowles |
| 7,780,089 | B2 | 8/2010 | Wang |
| 7,809,407 | B2 | 10/2010 | Oshima et al. |
| 7,810,720 | B2 | 10/2010 | Lovett |
| 7,813,047 | B2 | 10/2010 | Wang et al. |
| 7,909,257 | B2 | 3/2011 | Wang et al. |
| 7,918,398 | B2 | 4/2011 | Li et al. |
| 7,995,178 | B2 | 8/2011 | Suguro et al. |
| 2003/0062413 | A1 | 4/2003 | Gardiner et al. |
| 2003/0085284 | A1 | 5/2003 | Bremer et al. |
| 2003/0222144 | A1 | 12/2003 | Meier et al. |
| 2003/0222147 | A1 | 12/2003 | Havens et al. |
| 2004/0164165 | A1 | 8/2004 | Havens et al. |
| 2005/0001035 | A1 | 1/2005 | Hawley et al. |
| 2005/0023356 | A1 | 2/2005 | Wiklof et al. |
| 2005/0103854 | A1 | 5/2005 | Zhu et al. |
| 2005/0279836 | A1 | 12/2005 | Havens et al. |
| 2006/0011724 | A1 | 1/2006 | Joseph et al. |
| 2006/0043194 | A1 | 3/2006 | Barkan et al. |
| 2006/0113386 | A1 | 6/2006 | Olmstead |
| 2006/0163355 | A1 | 7/2006 | Olmstead et al. |
| 2006/0202036 | A1 | 9/2006 | Wang et al. |
| 2007/0138293 | A1 | 6/2007 | Zhu et al. |
| 2007/0181692 | A1 | 8/2007 | Barkan et al. |
| 2007/0284447 | A1 | 12/2007 | McQueen |
| 2008/0011856 | A1 | 1/2008 | Bremer et al. |
| 2008/0023556 | A1 | 1/2008 | Vinogradov et al. |
| 2008/0223933 | A1 | 9/2008 | Smith |
| 2009/0057413 | A1 | 3/2009 | Vinogradov et al. |
| 2009/0072038 | A1 | 3/2009 | Li et al. |
| 2009/0140050 | A1 | 6/2009 | Liu et al. |
| 2010/0044436 | A1 | 2/2010 | Powell et al. |
| 2010/0044440 | A1 | 2/2010 | Wang et al. |
| 2010/0078477 | A1 | 4/2010 | Wang et al. |
| 2010/0108769 | A1 | 5/2010 | Wang et al. |
| 2010/0147956 | A1 | 6/2010 | Wang et al. |

(56) References Cited

U.S. PATENT DOCUMENTS

| | | |
|---|---|---|
| 2010/0187310 A1* | 7/2010 | Meier et al. ............ 235/440 |
| 2011/0163165 A1 | 7/2011 | Liu et al. |
| 2011/0174880 A1 | 7/2011 | Li et al. |
| 2012/0000982 A1 | 1/2012 | Gao et al. |
| 2012/0111944 A1 | 5/2012 | Gao et al. |
| 2012/0138684 A1 | 6/2012 | Van Volkinburg et al. |
| 2012/0153022 A1 | 6/2012 | Havens et al. |
| 2012/0193429 A1 | 8/2012 | Van Volkinburg et al. |

* cited by examiner

SYSTEM OPERATIVE TO ADAPTIVELY SELECT AN IMAGE SENSOR FOR DECODABLE INDICIA READING

FIELD OF THE INVENTION

The present invention relates to image data processing in general and specifically to an image data processing system comprising two or more image sensors.

BACKGROUND OF THE PRIOR ART

Some of commercially available decodable indicia reading and decoding systems (portable and stationary data terminals, and other data collection systems) include a digital color camera and a dedicated monochrome image sensor intended for bar code reading. However, such systems lack the image sensor selection functionality for performing decodable indicia reading.

Therefore, a need exists to provide a system and method for selecting an image sensor for decodable indicia reading.

SUMMARY OF THE INVENTION

In one embodiment, there is provided a decodable indicia reading system comprising a central processing unit (CPU), a memory communicatively coupled to the CPU, and two or more image sensors communicatively coupled to the memory and/or the CPU. The system can be configured to select an image sensor for indicia reading by cycling through available image sensors to detect an image sensor suitable for an attempted indicia reading operation by comparing a measured parameter value to a pre-defined sensor-specific threshold value. The system can be further configured to select the first suitable or the best suitable image sensor for the attempted decodable indicia reading operation based upon the comparison result. The system can be further configured to notify the system operator which image sensor has been selected. The system can be further configured to obtain a decodable indicia image by the selected image sensor.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 1:
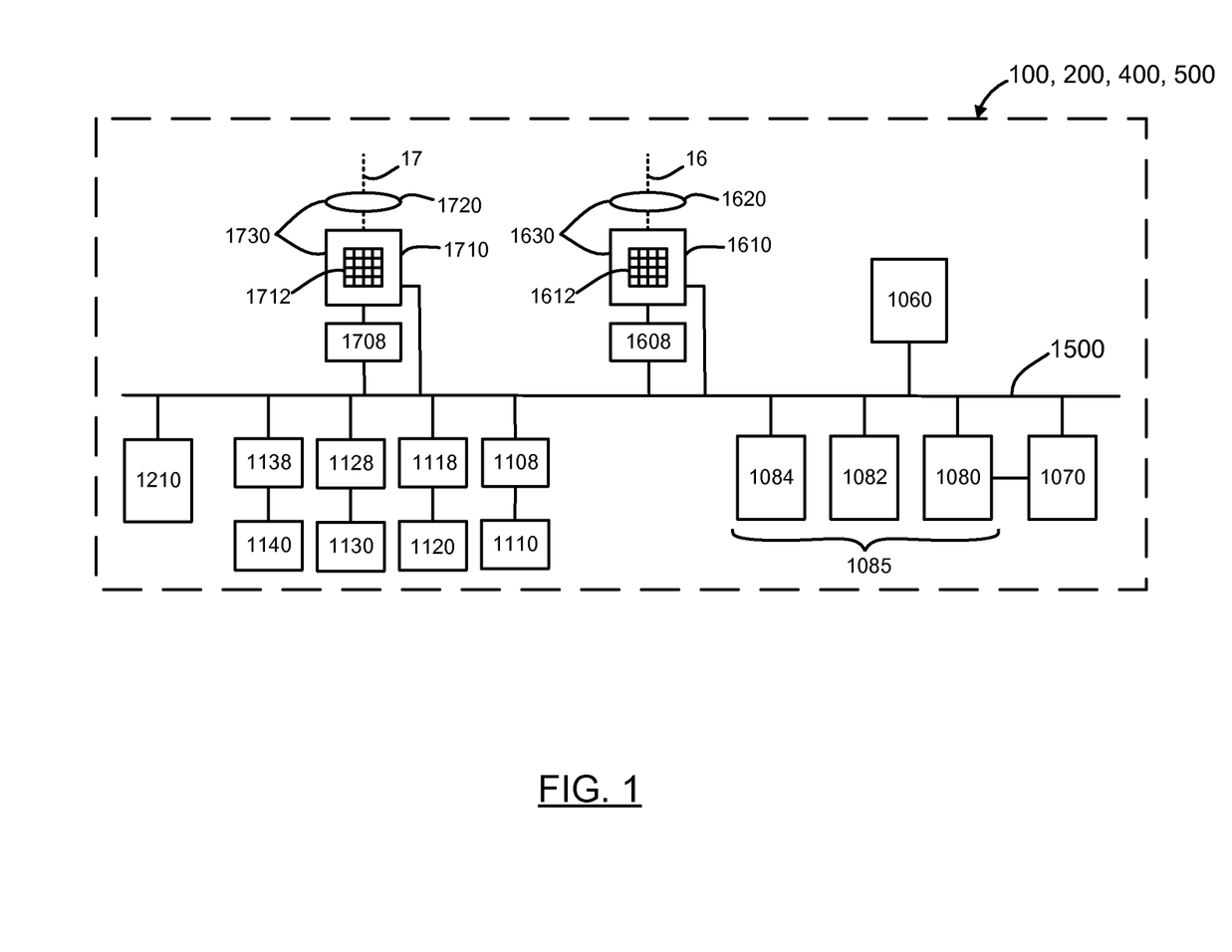
FIG. 1 is a block diagram illustrating exemplary components of one embodiment of the decodable indicia reading system according to the invention.

In one embodiment, there is provided a decodable indicia reading system operative to adaptively select an image sensor. A block diagram illustrating exemplary components of the decodable indicia reading system according to the invention is shown in FIG. 1. In one embodiment, the decodable indicia reading system 100 can include a CPU 1060 in communication with a memory 1085 via a system bus 1500. The memory 1085 can include one or more of a volatile memory 1080, e.g., RAM, a non-volatile memory 1082 e.g., ROM and a long-term storage memory 1084, e.g., a hard drive, a CD, a floppy and/or a flash memory device. Memory 1080, memory 1082, and memory 1084 can be regarded as recording medium.

In one aspect, the decodable indicia reading system 100 can include a trigger 1110, a pointer mechanism 1120, a keyboard 1130, and a display 1140. Each of the devices 1110, 1120, 1130, and 1140 can be communicatively coupled to system bus 1500 for communicating with the CPU 1060 via respective interfaces 1108, 1118, 1128, and 1138.

In another aspect, the decodable indicia reading system 100 can include a communication interface 1210 for communicating with external computers. The communication interface can be provided by a wire line communication interface (e.g, an Ethernet interface or a USB interface) or a wireless communication interface (e.g., an IEEE 802.11-compliant wireless communication interface or a Bluetooth interface). The system 100 can include more than one or more communication interfaces 1210.

In one embodiment, the decodable indicia reading system 100 can be provided by a portable data terminal (e.g., bar code reading terminal). In another embodiment, the decodable indicia reading system 100 can be provided by a stationary data terminal (e.g., a cash register). A skilled artisan would appreciate the fact that other form factors and applications of the decodable indicia reading system 100 are within the spirit and the scope of the invention.

Figure 2:
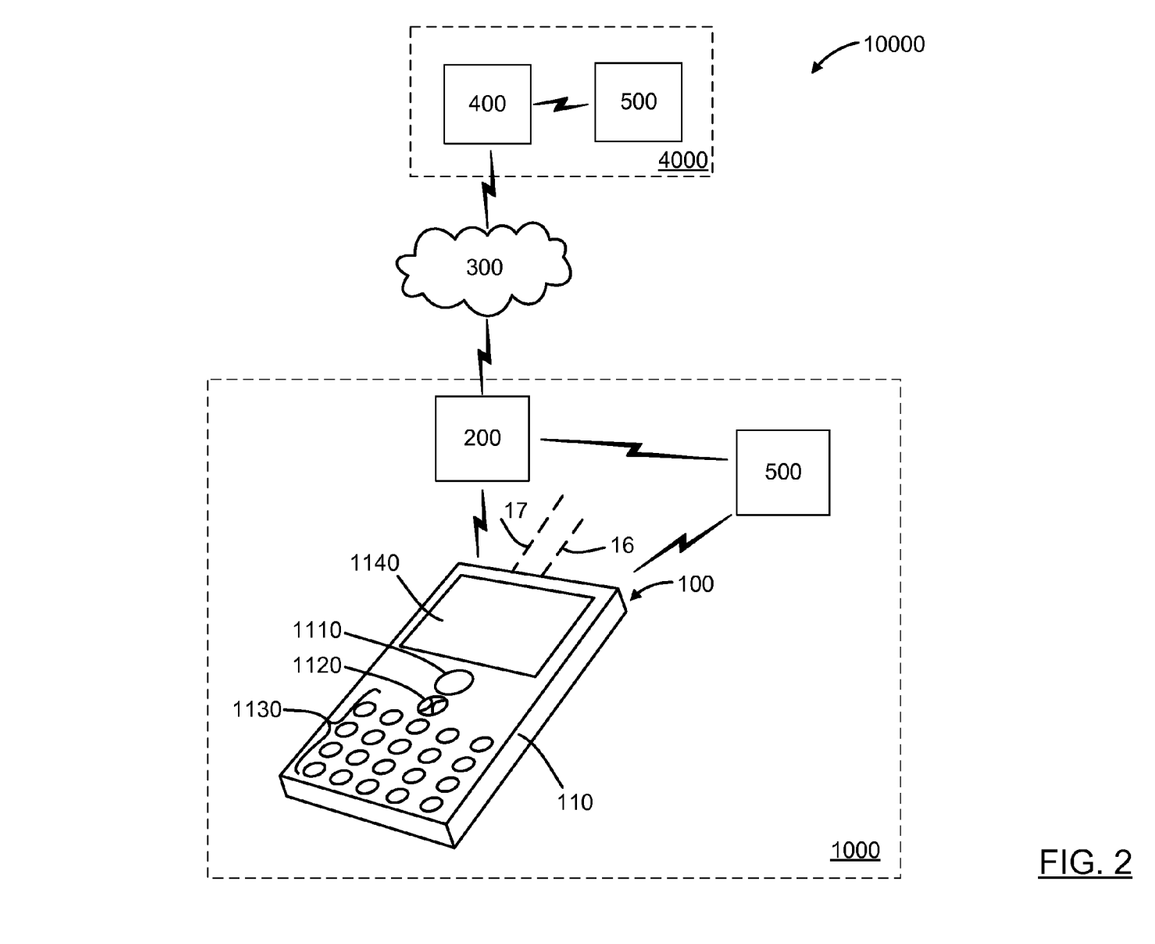
FIG. 2 is a system block diagram illustrating exemplary components of one embodiment of the data collection system according to the invention.

In another aspect, the decodable indicia reading system 100 can be part of a data collection system, e.g., a data collection system 10000 shown in FIG. 2. At a local facility 1000 there can be disposed a plurality of imaging reading terminals configured in accordance with system 100. In one example, local facility 1000 can be provided by a retail store. In another example, local facility 1000 can be provided by a warehouse. In another example, local facility 1000 can be provided by a health care facility. In one example, local facility 1000 can be provided by a personal residence. At local facility 1000 there can be included server 200 external to data terminal 100. In a further aspect, terminals 100 and server 200 can be in communication with a remote server 400 via network 300 which can be e.g., a TCP/IP network. Server 400 can be disposed at a facility 4000 remote from facility 1000. In a further aspect, one or more client computers 500 can also be included in the data collection system 10000. Client computer 500 in one embodiment can be provided by e.g., a desktop personal computer and laptop personal computer a smart phone e.g., IPHONE by Apple Computers, Inc., BLACKBERRY STORM by Research in Motion Limited.

By virtue of their including at least a central processing unit (CPU) 1060 in combination with a memory 1085, each of the data terminal 100, server 200, and client computer 500 of the data collection system 10000 can be regarded as a "computer." Each computer of the data collection system 10000 can be configured in accordance with the TCP/IP protocol so that each computer of the data collection system 10000 can be in IP network communication with each other computer of the data collection system 10000. While the data collection system 10000 in one embodiment is described as having the elements 100, 200, 300, 400, 500, the data collection system 10000 can be implemented in such manner as to have less than all of the noted elements, e.g., only one of the noted elements.

In another aspect, the decodable indicia reading system 100 can include two or more imaging assemblies. In one embodiment, the system 100 can include first and second imaging assemblies 1630 and 1730. In a further aspect, the imaging assembly 1630 can be provided by a monochrome imaging assembly and the imaging assembly 1730 can be provided by a color imaging assembly. A skilled artisan would appreciate the fact that decodable indicia reading systems comprising three or more imaging assemblies are within the spirit and the scope of the invention.

In a further aspect, the imaging assembly 1630 can include an image sensor pixel array 1612, a monochrome image sensor 1610 and an imaging lens assembly 1620 for focusing light onto image sensor pixel array 1612. Imaging assembly 1630 can have an imaging axis 16. The image sensor 1610 can include a monochrome image sensor pixel array 1612 having a plurality of monochrome pixels disposed in a 2D array comprising a plurality of rows and columns In a further aspect, the image sensor pixel array 1612 can be devoid of color filters so that pixels of array 1612 are sensitive to light in substantially all wavelengths in the visible spectrum.

In a further aspect, the image sensor 1610 can be provided in an image sensor integrated circuit having output processing circuitry for amplifying and digitizing image signals output by image sensor pixel array 1612. For capture of a frame of image data, image signals representing light incident on pixels of array 1612 can be read out of image sensor pixel array 1612, digitized and stored into system volatile memory 1080. Prior to performing the read out operation, pixels of array 1612 can be exposed during an exposure period. Signals for control of image sensor 1610, e.g., readout and exposure signals can be input by interface 1608 which can be communicatively coupled to system bus 1500 for providing communication with CPU 1060. In one embodiment, the interface 1608 can be provided by a Media Control Processor (MCP) interface.

Imaging terminal 100 can be operative so that terminal 100 captures a frame of image data responsively to trigger 1110 being actuated. A frame captured into memory 1080 prior to further processing by CPU 1060 can be regarded as a raw frame of image data.

In a further aspect, the imaging assembly 1730 can include an image sensor pixel array 1712, a color image sensor 1710 and an imaging lens assembly 1720 for focusing light axis. Imaging assembly 1730 can have an imaging axis 17. Image sensor 1710 can have color image sensor pixel array 1712 having a plurality of color pixels disposed in a 2D array having a plurality of rows and columns. In one embodiment, terminal 100 can be configured with suitable optics so that imaging axis 16 can be coincident with imaging axis 17. However, in another embodiment, terminal 100 can be configured so that imaging axis 16 and imaging axis 17 are spaced apart from one another. Terminal 100 can be configured so that axes 16 and 17 can extend in directions that are parallel to one another as shown in FIG. 2. In another embodiment, terminal 100 can be configured so that axes 16 and 17 extend in directions that are non-parallel with respect to one another. In one specific embodiment, terminal 100 can be configured so that imaging axis 16 extends forwardly from terminal 100 and imaging axis extends downwardly from terminal 100. Imaging axis directions herein are given as directions from an image sensor array toward a target being subject to image capture. In one embodiment, terminal 100 can be configured so that imaging assembly 1630 and imaging assembly 1730 define respective fields of view that at least partially overlap.

In another aspect, the image sensor 1710 can be provided in an image sensor integrated circuit having output processing circuitry for amplifying and digitizing image signals output by image sensor pixel array 1712. For capture of a frame of image data, image signals representing light incident on pixels of array 1712 can be read out of image sensor pixel array 1712, digitized and stored into system volatile memory 1080. Prior to performing the read out operation, pixels of array 1712 can be exposed during an exposure period. Signals for control of image sensor 1710, e.g., readout and exposure signals can be input by interface 1708 which can be communicatively coupled to system bus 1500 for providing communication with CPU 1060. In one embodiment, the interface 1708 can be provided by a Media Control Processor (MCP) interface.

In one embodiment as set forth herein imaging assembly 1630 can be a monochrome imaging assembly having a monochrome image sensor 1610, and imaging assembly 1730 can be a color imaging assembly having a color image sensor 1710.

In another embodiment as set forth herein, image sensor 1610 can be provided by a hybrid monochrome and color image sensor 1620 and imaging assembly 1630 can be a hybrid monochrome and color imaging assembly 1630 having a hybrid monochrome and color image sensor 1620 while imaging assembly 1730 is a color imaging assembly having a color image sensor 1710 as set forth previously herein.

Where imaging assembly 1630 is provided by a hybrid monochrome and color imaging assembly, image sensor 1610 can be provided in an image sensor integrated circuit having output processing circuitry for amplifying and digitizing image signals output by image sensor pixel array 1612. Image sensor pixel array 1612 can be a hybrid monochrome and color image sensor array having a first subset of monochrome pixels without color filter elements and a second subset of color pixels having color sensitive filter elements. For capture of a frame of image data, image signals representing light incident on pixels of array 1612 can be read out of image sensor pixel array 1612, digitized and stored into system volatile memory 1080. Prior to performing the read out operation, pixels of array 1612 can be exposed during an exposure period. Signals for control of image sensor 1610, e.g., readout and exposure signals can be input by interface 1608 which can be communicatively coupled to system bus 1500 for providing communication with CPU 1060. In one embodiment, the interface 1608 can be provided by a Media Control Processor (MCP) interface.

In one embodiment, terminal 100 can comprise more than two imaging assemblies, e.g., can comprise a first imaging assembly having a hybrid monochrome and color image sensor, a second imaging assembly having a color image sensor devoid of monochrome pixels and a third imaging assembly having a monochrome image sensor devoid of pixels having color filter elements, and an Nth imaging assembly being configured similarly or differently from one of the first, second, or third imaging assemblies.

Image terminal 100 can be operative so that terminal 100 captures a frame of image data responsively to trigger 1110 being actuated. A frame captured into memory 1080 prior to further processing by CPU 1060 can be regarded a raw frame.

In another aspect, for attempting to decode a bar code symbol, e.g., a one dimensional bar code symbol, the decodable indicia reading system 100 can process image data of a frame corresponding to a line of pixel positions (e.g., a row, a column, or a diagonal set of pixel positions) to determine a spatial pattern of dark and light cells and can convert each light and dark cell pattern determined into a character or character string via table lookup. Where a decodable indicia representation is a 2D bar code symbology, a decode attempt can comprise the steps of locating a finder pattern using a feature detection algorithm, locating matrix lines intersecting the finder pattern according to a predetermined relationship with the finder pattern, determining a pattern of dark and light cells along the matrix lines, and converting each light pattern into a character or character string via table lookup. In one embodiment, the decodable indicia reading system 100 can be operative to capture a frame of image data and process the frame for attempting to decode the frame responsively to an actuation of trigger 1110. When processing a color frame of image data for attempting to decode a decodable indicia, the system 100 can first transform the color image data into monochrome image data. Such transformation can comprise utilizing image data from only a single channel of pixel positions (e.g., by interpolating pixel values for blue and red pixel positions utilizing pixel values at green pixel positions so that an all green frame is output, which can be regarded as a monochrome frame of image data).

In one embodiment, the decodable indicia reading system 100 can, responsively to an actuation of the trigger 1110, capture a frame of image data and subjects image data of a frame to a decode attempt. Also, responsively to an actuation of the trigger 1110, the decodable indicia reading system 100 can format image data of a captured frame into a standard image format, e.g., BMP, PDF, JPG, TIF and can transmit the formatted image file to an external computer, e.g., server 200, server 400, client computer 500.

One embodiment of a physical form factor of the decodable indicia reading system is shown in FIG. 1. Components described with reference to FIG. 1 can be disposed within portable hand held housing 110 and can be supported within a portable hand held housing 110. Referring to further aspect of the data collection system 10000, each of server 200, server 400, and client computer 500 can include components described with reference to the decodable indicia reading system 100. In some instances, the decodable indicia reading system 100, server 400 and client computer 500 can have devices in addition to those shown in FIG. 1. In some instances the servers 200, 400 and client computer 500 can have components deleted relative to those shown in FIG. 1 (for example, the server 200 can be devoid of a display 1140 and imaging assemblies 1630, 1730).

As noted herein supra, the decodable indicia reading system 100 can include two or more imaging assemblies. In one embodiment, a first imaging assembly can be provided by a monochrome imaging assembly and a second imaging assembly can be provided by a color imaging assembly. The inventors found that using the monochrome image sensor for decodable reading in some situations (e.g., low ambient light) would produce a better signal to noise ratio. However, in other situations (e.g., for particular color spectral contents of the image) a better signal to noise ratio (and, hence, better decode success rate) can be obtained using a color image sensor.

In another embodiment, a first imaging assembly can be provided by an imaging assembly with a lower resolution than that of a second imaging assembly. The inventors found that using the lower resolution image sensor can be advantageous in some situations, since the image processing time and the amount of memory required for the processing grows exponentially with the image resolution. Hence, the lower resolution image sensor can be preferred in time-critical or memory-critical applications.

The selection of an image sensor which is more suitable for the attempted decodable indicia reading operation can be based upon comparing a measured parameter value to a pre-defined value.

In one embodiment, the sensor selection parameter can be provided by a decoding time required to locate and decode the decodable indicia using the captured image. As noted herein supra, for some time-critical applications, the decoding time can be a threshold factor in deciding whether an image obtained by a selected image sensor is acceptable for further processing.

In another embodiment, the sensor selection parameter can be provided by a required exposure time. High exposure values can be unacceptable for portable form factors of the decodable indicia reading system 100, and hence, the image sensor selection can be based upon comparing the required exposure time to a pre-defined threshold value.

In another embodiment, the sensor selection parameter can be provided by the ambient light intensity. The sensor selection can be performed by comparing the ambient light intensity to a pre-defined value, since for a given image sensor the exposure time dependence upon the ambient light intensity can be a known function.

In another embodiment, the sensor selection parameter can be provided by a signal to noise ratio obtained in the decodable indicia image. The sensor selection can be performed by comparing the signal-to-noise ratio to a pre-defined value.

In another aspect, measuring the sensor selection parameter value can be performed as part of an attempted decodable indicia locating and decoding operation. Should the attempted locating and decoding operation fail, the image sensor selection method can be performed as described herein supra.

In another embodiment, measuring the sensor selection parameter value can be performed without obtaining the decodable indicia image.

Figure 3:
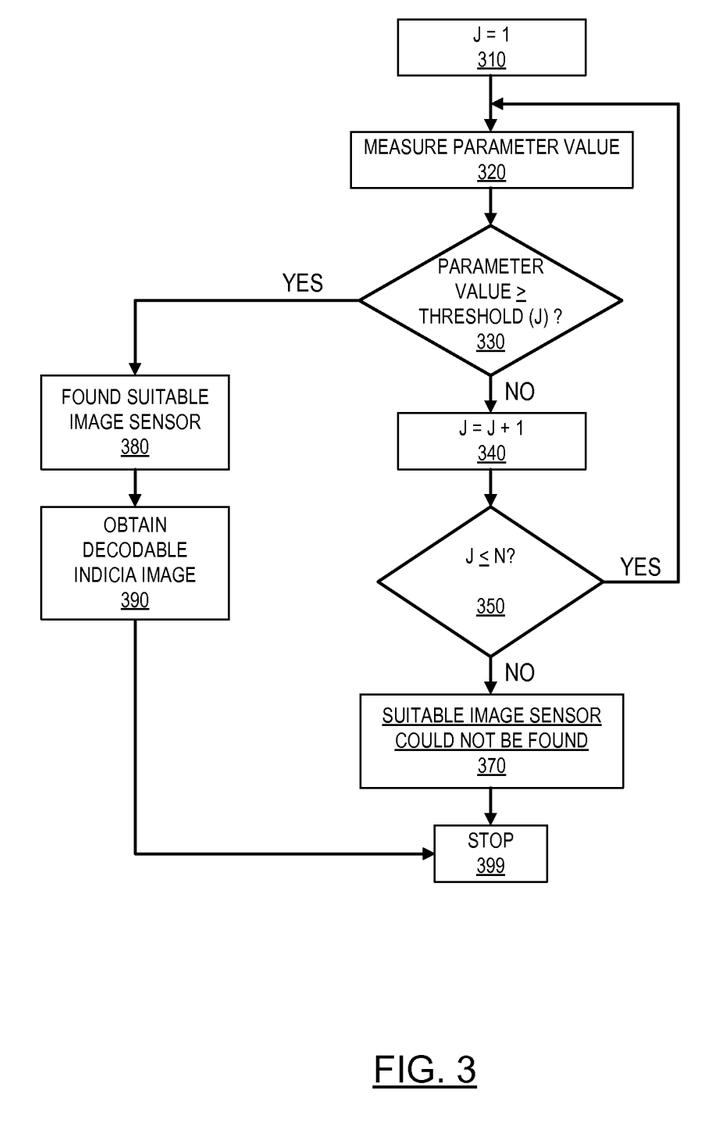
FIG. 3 illustrates a flowchart of one embodiment of a method for adaptively selecting an image sensor for reading decodable indicia by a decodable indicia reading system according to the invention.

One embodiment of the method for adaptively selecting an image sensor for reading decodable indicia by a decodable indicia reading system according to the invention is now being described with references to FIG. 3.

At step 310, the counter J of available image sensors can be initialized with the value of 1. In one embodiment, at least one image sensor can be provided by a monochrome image sensor, and at least one image sensor can be provided by a color image sensor. In another embodiment, at least two of available image sensors can provide different image resolutions. In a yet another embodiment, at least two of available image sensors can provide different signal to noise ratios.

At step 320, a value of a sensor selection parameter can be measured using a J-th image sensor. As noted herein supra, the sensor selection parameter can be provided by a decoding time, a required exposure time, an ambient light intensity, and/or a signal to noise ratio. A skilled artisan would appreciate the fact that measuring values of two or more sensor selection parameters is within the spirit and the scope of the invention.

In one embodiment, measuring the sensor selection parameter value can be performed as part of an attempted decodable indicia locating and decoding operation. In another embodiment, different sensor selection parameters can be used for different image sensors.

At step 330, the measured parameter value can be compared to a pre-defined sensor-specific threshold value for the J-th sensor. If the measured parameter value is greater than or equal to the pre-defined threshold value, the method can branch to step 380; otherwise, the method can continue to step 340.

At step 340, the counter J of available image sensors can be incremented by 1.

At step 350, the counter J can be compared to the number of available image sensors. If the value of J is less than or equal to the number of available image sensors, the method can cycle to step 320. Otherwise, the method can continue to step 370.

At step 370, a message to the decodable indicia reading system operator can be displayed notifying the operator that a suitable image sensor could not be found. The notification can also be performed by an audible signal or a tactile signal. The method can terminate at step 399.

At step 380, a message to the decodable indicia reading system operator can be displayed notifying the operator that a suitable image sensor has been selected. The notification can also be performed by an audible signal or a tactile signal.

A skilled artisan would appreciate the fact that the operator notification steps 370 and 380 are not essential and can be omitted from the method implementation.

At step 390, a decodable indicia image can be obtained by the J-th image sensor. The image can be further processed to locate and decode the decodable indicia.

The method can terminate at step 399.

A small sample of systems methods and apparatus that are described herein is as follows:

A1. A decodable indicia reading system comprising:
   a central processing unit (CPU);
   a memory communicatively coupled to said CPU;
   two or more image sensors communicatively coupled to one of: said memory, said CPU;
   a hand held housing in which the two or more image sensors are disposed;
   wherein said system is configured to select a suitable image sensor for an indicia reading operation by cycling through said two or more image sensors and comparing a measured value of a parameter to a pre-defined sensor-specific threshold value for each of said two or more image sensors;
   wherein said system is further configured to notify an operator of said system about selecting said suitable image sensor; and
   wherein said system is further configured to obtain a decodable indicia image by said suitable image sensor.

A2. The system of A1, wherein said suitable image sensor is the best suitable image sensor for said indicia reading operation.

A3. The system of A1, wherein said parameter is provided by one of: a decoding time, a required exposure time, an ambient light intensity, and a signal to noise ratio.

A4. The system of A1, wherein at least one image sensor of said two or more image sensors is provided by a color image sensor.

A5. The system of A1, wherein at least one image sensor of said two or more image sensors is provided by a monochrome image sensor.

A6. The method of A1, wherein at least one image sensor of said two or more image sensors is provided by a hybrid monochrome and color image sensor.

A7. The system of A1, wherein said first image sensor of said two or more image sensors is configured to provide a first image resolution, and said second image sensor of said two or more image sensors is configured to provide a second image resolution; and
   wherein said second image resolution is greater than said first image resolution.

A8. The system of A1, wherein said first image sensor of the two or more image sensors is configured to provide a first signal to noise ratio, and said second image sensor of the two or more image sensors is configured to provide a second signal to noise ratio; and
   wherein said second signal to noise ratio is greater than said first signal to noise ratio.

A9. The system of A1 further configured to notify said operator by at least one of: an audible signal, a visual signal, a tactile signal.

B1. A method for adaptively selecting an image sensor for reading decodable indicia by a decodable indicia reading system including two or more image sensors that are disposed within a hand held housing, said method comprising the steps of:
   (i) for each image sensor of said two or more image sensors determining whether said image sensor is suitable for an attempted indicia reading operation by comparing a measured value of a parameter to an image sensor-specific pre-defined value;
   (ii) performing at least one of: (a) conditionally branching to step (iii) upon detecting a second image sensor for which said step of comparing yields a pre-defined result, and (b) selecting a second image sensor for which said step of comparing yields the best result among all image sensors of said two or more image sensors;
   (iii) obtaining a decodable indicia image by said second image sensor.

B2. The method of B1, wherein said step (iii) is preceded by a step of notifying an operator of said decodable indicia reading system about said second image sensor having been selected for an attempted indicia reading operation B3. The method of B1, wherein said parameter is provided by one of: a decoding time, a required exposure time, an ambient light intensity, and a signal to noise ratio.

B4. The method of B1, wherein at least one image sensor of said two or more image sensors is provided by a color image sensor.

B5. The method of B1, wherein at least one image sensor of said two or more image sensors is provided by a monochrome image sensor.

B6. The method of B1, wherein at least one image sensor of said two or more image sensors is provided by a hybrid monochrome and color image sensor.

B7. The method of B1, wherein said first image sensor of said two or more image sensors is configured to provide a first image resolution, and said second image sensor of said two or more image sensors is configured to provide a second image resolution; and
   wherein said second image resolution is greater than said first image resolution.

B8. The method of B1, wherein said first image sensor of the two or more image sensors is configured to provide a first signal to noise ratio, and said second image sensor of the two or more image sensors is configured to provide a second signal to noise ratio; and
   wherein said second signal to noise ratio is greater than said first signal to noise ratio.

B9. The method of B2, wherein said step of notifying is performed by at least one of: an audible signal, a visual signal, a tactile signal.

C1. A method for adaptively selecting an image sensor for reading decodable indicia by a decodable indicia reading system including two or more image sensors, said method comprising the steps of:
   (i) obtaining a decodable indicia image by a first image sensor;
   (ii) attempting to locate and decode a decodable indicia within said decodable indicia image;
   (iii) conditionally, upon said step (ii) failure, performing the following steps (iv)-(vii):
   (iv) measuring a value of a parameter for said decodable indicia image;
   (v) for each image sensor of said two or more image sensors excluding said first image sensor, determining whether said image sensor is suitable for an attempted indicia reading operation by comparing said value to an image sensor-specific pre-defined value;

(vi) performing at least one of: (a) conditionally branching to step (vii) upon detecting a second image sensor for which said step of comparing yields a pre-defined result, and (b) selecting a second image sensor for which said step of comparing yields the best result among all image sensors of said two or more image sensors;

(vii) obtaining a decodable indicia image by said second image sensor.

C2. The method of C1, wherein said step (iv) is preceded by a step of notifying an operator of said decodable indicia reading system about said second image sensor having been selected for an attempted indicia reading operation C3. The method of C1, wherein said parameter is provided by one of: a decoding time, a required exposure time, an ambient light intensity, and a signal to noise ratio.

C4. The method of C1, wherein at least one image sensor of said two or more image sensors is provided by a color image sensor.

C5. The method of C1, wherein at least one image sensor of said two or more image sensors is provided by a monochrome image sensor.

C6. The method of C1, wherein at least one image sensor of said two or more image sensors is provided by a hybrid monochrome and color image sensor.

C7. The method of C1, wherein said first image sensor of said two or more image sensors is configured to provide a first image resolution, and said second image sensor of said two or more image sensors is configured to provide a second image resolution; and wherein said second image resolution is greater than said first image resolution.

C8. The method of C1, wherein said first image sensor of the two or more image sensors is configured to provide a first signal to noise ratio, and said second image sensor of the two or more image sensors is configured to provide a second signal to noise ratio; and wherein said second signal to noise ratio is greater than said first signal to noise ratio.

C9. The method of C2, wherein said step of notifying is performed by at least one of: an audible signal, a visual signal, a tactile signal.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than or greater than the mentioned certain number of elements. Also, while a number of particular embodiments have been described, it will be understood that features and aspects that have been described with reference to each particular embodiment can be used with each remaining particularly described embodiment.

I claim:

1. A decodable indicia reading system comprising:
a central processing unit (CPU);
a memory communicatively coupled to said CPU;
two or more image sensors communicatively coupled to one of: said memory, said CPU;
a hand held housing in which the two or more image sensors are disposed;

wherein said system is configured to select a suitable image sensor for an indicia reading operation by cycling through said two or more image sensors and comparing a measured value of a parameter to a pre-defined sensor-specific threshold value for each of said two or more image sensors;

wherein said system is further configured to notify an operator of said system about selecting said suitable image sensor; and wherein said system is further configured to obtain a decodable indicia image by said suitable image sensor.

2. The system of claim 1, wherein said suitable image sensor is a best suitable image sensor for said indicia reading operation.

3. The system of claim 1, wherein said parameter is provided by one of: a decoding time, a required exposure time, an ambient light intensity, and a signal to noise ratio.

4. The system of claim 1, wherein at least one image sensor of said two or more image sensors is provided by a color image sensor.

5. The system of claim 1, wherein at least one image sensor of said two or more image sensors is provided by a monochrome image sensor.

6. The system of claim 1, wherein at least one image sensor of said two or more image sensors is provided by a hybrid monochrome and color image sensor.

7. The system of claim 1, wherein a first image sensor of said two or more image sensors is configured to provide a first image resolution, and a second image sensor of said two or more image sensors is configured to provide a second image resolution; and wherein said second image resolution is greater than said first image resolution.

8. The system of claim 1, wherein a first image sensor of the two or more image sensors is configured to provide a first signal to noise ratio, and a second image sensor of the two or more image sensors is configured to provide a second signal to noise ratio; and wherein said second signal to noise ratio is greater than said first signal to noise ratio.

9. The system of claim 1 further configured to notify said operator by at least one of: an audible signal, a visual signal, a tactile signal.

10. A method for adaptively selecting an image sensor for reading decodable indicia by a decodable indicia reading system including two or more image sensors that are disposed within a hand held housing, said method comprising the steps of:

(i) for each image sensor of said two or more image sensors determining whether said image sensor is suitable for an attempted indicia reading operation by comparing a measured value of a parameter to an image sensor-specific pre-defined value;

(ii) performing at least one of: (a) conditionally branching to step (iii) upon detecting a second image sensor for which said step of comparing yields a pre-defined result, and (b) selecting a second image sensor for which said step of comparing yields a best result among all image sensors of said two or more image sensors;

(iii) obtaining a decodable indicia image by said second image sensor.

11. The method of claim 10, wherein said step (iii) is preceded by a step of notifying an operator of said decodable indicia reading system about said second image sensor having been selected for an attempted indicia reading operation.

12. The method of claim 11, wherein said step of notifying is performed by at least one of: an audible signal, a visual signal, a tactile signal.

13. The method of claim 10, wherein at least one image sensor of said two or more image sensors is provided by a color image sensor.

14. The method of claim 10, wherein at least one image sensor of said two or more image sensors is provided by a monochrome image sensor.

15. The method of claim 10, wherein at least one image sensor of said two or more image sensors is provided by a hybrid monochrome and color image sensor.

16. The method of claim 10, wherein a first image sensor of said two or more image sensors is configured to provide a first image resolution, and a second image sensor of said two or more image sensors is configured to provide a second image resolution; and wherein said second image resolution is greater than said first image resolution.

17. The method of claim 10, wherein a first image sensor of the two or more image sensors is configured to provide a first signal to noise ratio, and a second image sensor of the two or more image sensors is configured to provide a second signal to noise ratio; and wherein a second signal to noise ratio is greater than said first signal to noise ratio.

18. The method of claim 10, wherein said parameter is provided by one of: a decoding time, a required exposure time, an ambient light intensity, and a signal to noise ratio.

19. A method for adaptively selecting an image sensor for reading decodable indicia by a decodable indicia reading system including two or more image sensors, said method comprising the steps of:
(i) obtaining a decodable indicia image by a first image sensor;
(ii) attempting to locate and decode a decodable indicia within said decodable indicia image;
(iii) conditionally, upon a failure of step (ii), performing the following steps (iv)-(vii):
(iv) measuring a value of a parameter for said decodable indicia image;
(v) for each image sensor of said two or more image sensors excluding said first image sensor, determining whether said image sensor is suitable for an attempted indicia reading operation by comparing said value to an image sensor-specific pre-defined value;
(vi) performing at least one of: (a) conditionally branching to step (vii) upon detecting a second image sensor for which said step of comparing yields a pre-defined result, and (b) selecting a second image sensor for which said step of comparing yields a best result among all image sensors of said two or more image sensors;
(vii) obtaining a decodable indicia image by said second image sensor.

20. The method of claim 19, wherein said step (iv) is preceded by a step of notifying an operator of said decodable indicia reading system about said second image sensor having been selected for an attempted indicia reading operation.

21. The method of claim 20, wherein said step of notifying is performed by at least one of: an audible signal, a visual signal, a tactile signal.

22. The method of claim 19, wherein at least one image sensor of said two or more image sensors is provided by a color image sensor.

23. The method of claim 19, wherein at least one image sensor of said two or more image sensors is provided by a monochrome image sensor.

24. The method of claim 19, wherein at least one image sensor of said two or more image sensors is provided by a hybrid monochrome and color image sensor.

25. The method of claim 19, wherein said first image sensor of said two or more image sensors is configured to provide a first image resolution, and said second image sensor of said two or more image sensors is configured to provide a second image resolution; and wherein said second image resolution is greater than said first image resolution.

26. The method of claim 19, wherein said first image sensor of the two or more image sensors is configured to provide a first signal to noise ratio, and said second image sensor of the two or more image sensors is configured to provide a second signal to noise ratio; and wherein said second signal to noise ratio is greater than said first signal to noise ratio.

27. The method of claim 19, wherein said parameter is provided by one of: a decoding time, a required exposure time, an ambient light intensity, and a signal to noise ratio.

* * * * *